Patented Nov. 14, 1922.

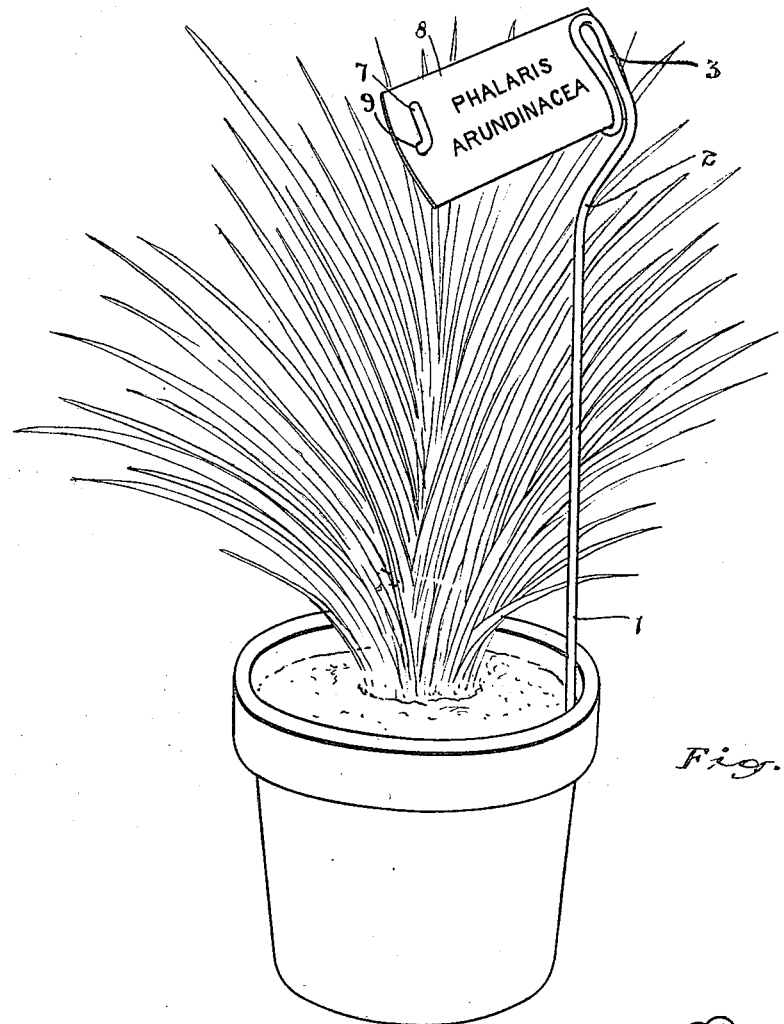
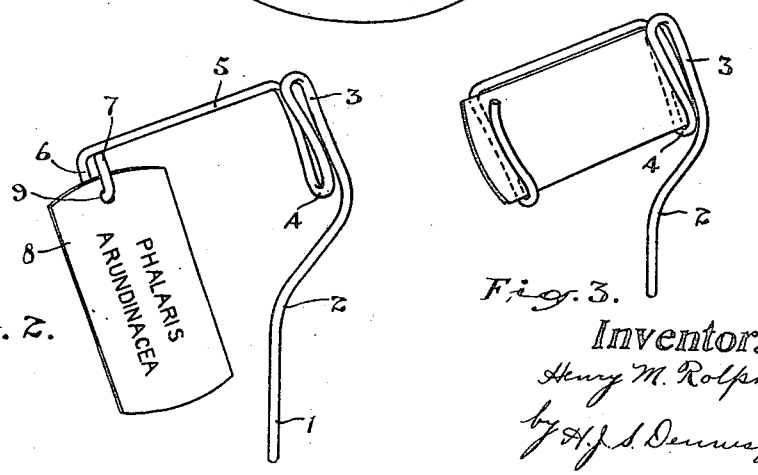

1,435,178

UNITED STATES PATENT OFFICE.

HENRY M. ROLPH, OF MARKHAM, ONTARIO, CANADA.

PLANT MARKER.

Application filed February 3, 1922. Serial No. 534,929.

*To all whom it may concern:*

Be it known that I, HENRY M. ROLPH, a subject of the King of Great Britain, and resident of the village of Markham, county of York, Province of Ontario, in the Dominion of Canada, have invented certain new and useful Improvements in Plant Markers, described in the following specification and illustrated in the accompanying drawings, that form part of the same.

The objects of the invention are, to provide a simple and effective device for marking plants which will facilitate the work of the gardener or horticulturist and which may be produced very cheaply.

The principal feature of the invention consists in the novel formation of a length of wire into a supporting loop having an extension on which a marking plate is removably secured and supported by the loop.

In the drawings, Figure 1 is a perspective view of my improved marker.

Figure 2 is a perspective view showing the method of removing the label from the holder.

Figure 3 is a perspective view of a modified form.

In the planting of various seeds and plants it is important that proper designation of the seeds or young plants be arranged so that their nature may be readily determined and it will of course be understood that a marker to be useful must be capable of being produced very cheaply, otherwise the expense where thousands of plants require to be marked would be very burdensome to the florists or gardeners.

In the present invention I have formed a marker of a single length of wire having a straight shank 1 adapted to be inserted in the ground. The upper end of this shank is bent at an obtuse angle at 2 and a loop 3 is formed extending upwardly and at an obtuse angle to the bent portion and to the stem 1.

A secondary loop 4 is formed by a further bend of the wire, the open side of the loop being adjacent and at the underside of the loop 3. The wire then extends horizontally in a bar 5 and the end is bent downwardly forming a loop 6, the terminal end 7 of which extends upwardly.

The centre of the loop 6 is preferably arranged about midway of the depth of the loop 4 and is substantially parallel with the loop 4. The marker plate 8 is preferably formed of thin sheet metal which may be readily stamped or marked upon to indicate the name or other designation of the plant. This plate is provided with a hole 9 at one end.

In securing the marker plate in the holder, the end 7 of the loop 6 is inserted through the hole 9 in the manner illustrated in Figure 2. The plate is then rotated upon the loop so that the free end is swung into the open side of the loop 4 and passing behind the loop 3 the bottom edge of the plate rests against the bottom of the loop 4. The plate is thus held very securely in position as the loop 4 is preferably made to pinch the plate and it will not shake out of position or be dislodged through any ordinary handling, or unless it is deliberately pulled out.

The plate may of course be very readily changed if desired by simply pulling it out of the loop 4 and slipping it off the loop 6.

A marker such as described is extremely simple, the whole consisting of one piece of wire very simply formed while the plate is extremely simple requiring in the form shown only the punching of a hole but even this may be eliminated by forming the loop at the free end sufficiently deep to receive the plate in the manner similar to the loop 4 as illustrated in Figure 3.

What I claim as my invention is:—

A plant marker formed of a length of wire bent downwardly in a loop and having the lower end of the downward portion bent upwardly in a plane at right angles to the first loop and turned at its upper end in a direction parallel with the first loop forming an open jaw, a hook end on the extremity of the laterally turned end of the wire, and a plate secured upon said hook end and gripped in the open jaw.

HENRY M. ROLPH.

Witness:
A. T. WILSON.